March 13, 1945.   F. V. CALHOUN   2,371,127
FLOATING REAMER
Filed Nov. 1, 1943
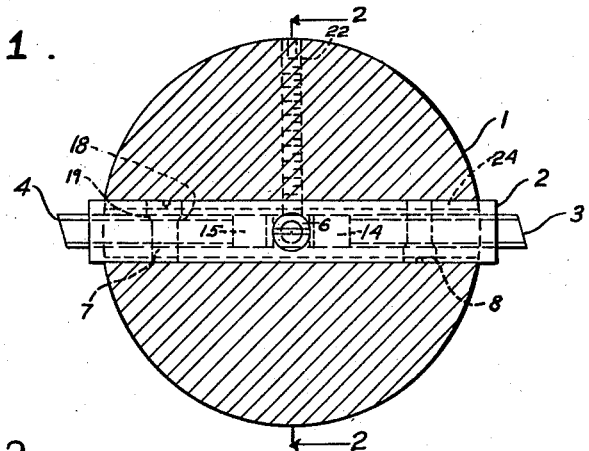
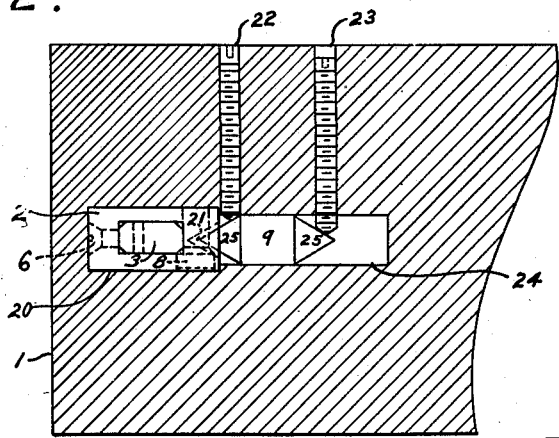
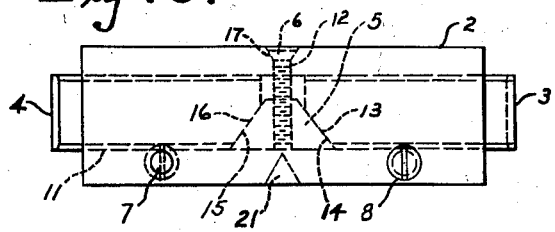
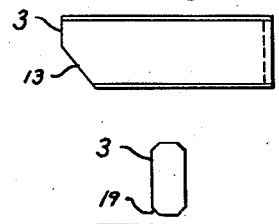
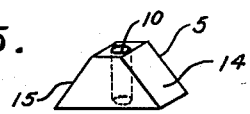
INVENTOR.
FRANK V. CALHOUN
BY
*Frank H. Harmon*
ATTORNEY Patented Mar. 13, 1945

2,371,127

UNITED STATES PATENT OFFICE 2,371,127

FLOATING REAMER

Frank V. Calhoun, Canton, Ohio, assignor, by mesne assignments, to Jack & Heintz, Inc., Cleveland, Ohio, a corporation of Ohio Application November 1, 1943, Serial No. 508,578

4 Claims. (Cl. 77—75)

This invention relates to an improvement in floating reamers and has as a primary object to provide a self-centering, floating reamer of simplified construction to overcome the former difficulty in holding reamer blades securely within a reamer bar during a reaming operation.

Another object is to provide a simple means of adjusting the amount of float in a reamer without removing the reamer bar from the tool holder.

Another object is to provide in the construction of a reamer bar means for allowing the reamer bar to be centered in a grinding machine for grinding the reamer blades without removing the blades from the reamer bar.

Still another object is to provide a single means for holding a reamer bar within a tool holder and for controlling the amount of float of the reamer during a reaming operation.

With these and other objects in mind, the invention resides in the combination of parts and in the details of construction and operation hereinafter set forth in the following specification and appended claims, certain embodiments thereof being illustrated in the accompanying drawing in which:

Figure 1 is a view in cross section of a reamer holder showing the reamer in side elevation installed therein;

Figure 2 is a view in section taken along line 2—2 of Figure 1 showing the reamer installed in the holder, the holder being cross-sectioned at the mid point of the reamer.

Figure 3 is a top plan view of the reamer and its adjustable blades removed from the holder;

Figure 4 is a plan view of a reamer blade;

Figure 5 is an isometric view of the wedge adjusting means of the reamer; and

Figure 6 is an end view of the reamer blade shown in Figure 4.

Referring more particularly to Figure 3 of the drawing, a reamer bar 2 is shown as having two similar reamer blades 3 and 4 adjustably inserted therein in a longitudinal slot 11. A wedge 5 having bevelled surfaces 14 and 15 is located in the slot 11 also, between blades 3 and 4, and contacts the similarly bevelled surfaces 13 and 16 of the reamer blades respectively.

A screw 6 having a bevelled head 17 is shown projecting through bore 12 of the reamer bar into a tapped hole 10 in the wedge 5. Two set screws 7 and 8 are shown extending through the reamer bar 2 in such a manner that their bevelled head surfaces 18 firmly engage the similarly bevelled surfaces 19 of the blades 3 and 4.

Prior to insertion into the tool holder 1, the reamer blades 3 and 4 are adjusted to a desired diameter by means of adjusting screw 6. As it is turned properly, this screw engages more threads in the tap 10 of wedge 5 drawing the wedge toward the screw head. This movement of the wedge forces the blades 3 and 4 outward, since bevelled surfaces 14 and 15 of the wedge contact surfaces 13 and 16 of the blades respectively.

When the desired adjustment of the blades is obtained, the two set screws 7 and 8 are tightened, thereby holding blades 3 and 4, respectively, fixed in position. The positioning of these set screws is considered unique in that the blades are fixedly held by the resultant force of the tightening action of the screws on the blades, since the contact between the screws and the blades is made by the bevelled surfaces 18 and 19. By utilizing this resultant force means for firmly fixing a blade within a reamer bar, the blade is held in tight frictional engagement with two sides of slot 11 instead of one, which would be the case if the set screw merely directly contacted one side of the blade.

In Figures 1 and 2, the reamer of Figure 3 is shown inserted in slot 20 of cylindrical tool holder 1. A pair of screws 22 and 23 having bevelled end portions are positioned in holder 1 so as to be at right angles to slot 24 and to the longitudinal axis of a member 9. When the reamer is placed in slot 20 member 9, having a conical tip 25, is moved by tightening screw 23 and loosening screw 22 so that the conical tip 25 engages conical detent 21 in the reamer bar. The member 9 along with its adjusting screws thereby provides a means for retaining the reamer in slot 20 while at the same time permitting the reamer to float any desired amount within the limits of the size of detent 21 and the amount of engagement of detent 21 by the cone portion 25 of member 9.

The purpose in having the detent 21 coaxial with the hole 12 which is located on the opposite side of the reamer blades in reamer bar 2 is so that two centers of a grinder may engage either side of said reamer bar to hold the reamer blades in a position for grinding following the removal of adjusting screw 6 from the hole 12. It should be noticed that the entrance to hole 12 is bevelled at an angle similar to the slope of the cone-shaped detent 21 for the purpose of receiving two similarly shaped grinder centers.

Thus it is seen that this construction not only simplifies the manufacture and lowers the cost of this type of reaming tool, but also provides a simple and practical means for holding reamer blades in a reamer bar and an adjustable floating means suitable to most reaming applications.

I claim:

1. A reamer comprising a blade holding bar, said bar having a longitudinal slot therein, a pair of oppositely disposed reamer blades having an angular cross section and having bevelled surfaces at one end inserted in said slot, a wedge having a centrally located tap disposed centrally in said slot between the reamer blades and normally maintaining contact with the bevelled end surfaces of said blades, an adjusting screw projecting through the reamer bar at right angles to the bar slot and engaging the threads of the tap in said wedge, and a pair of set screws having bevelled heads, one screw being located at substantially the mid point between the wedge adjusting screw and the ends of the reamer bar on either side of said adjusting screw, projecting through the reamer bar from opposite sides at right angles to the bar slot at a point adjacent to one side of a reamer blade so that only the bevelled screw heads engage one of the angular surfaces on a reamer blade, a tool holder for holding said bar having means for adjusting the amount of float of said bar and including a detent disposed coaxially with said wedge adjusting screw and a single adjustable element in said holder to progressively engage said detent.

2. A floating reamer comprising a blade holding bar, said bar having a longitudinal slot therein, a pair of oppositely disposed reamer blades having an angular cross section and having bevelled surfaces at one end inserted in said slot, a wedge having a centrally located tap disposed centrally in said slot between the reamer blades and normally maintaining contact with the bevelled end surfaces of said blades, a bevelled head adjusting screw projecting through the reamer bar at right angles to the bar slot and engaging the threads of the tap in said wedge, and a pair of set screws having bevelled heads, one screw being located at substantially the mid point between the wedge adjusting screw and the ends of the reamer bar on either side of said adjusting screw, projecting through the reamer bar from opposite sides at right angles to the bar slot at a point adjacent to one side of a reamer blade so that only the bevelled screw heads engage one of the angular surfaces on a reamer blade, a single means for locating said bar in its holder and adjusting the float thereof, said means comprising a centrally located conical detent in one side of the reamer bar, the axis of said detent being coaxial with the axis of the wedge adjusting screw and a single member disposed in said holder at right angles to said bar to progressively engage said detent.

3. A reamer comprising a blade holding bar, a tool holder for releasably holding said bar said bar having a longitudinal four-sided slot therein, a pair of oppositely disposed octagonally shaped reamer blades having bevelled inner end surfaces and mounted in the slot within the reamer bar in normally close frictional engagement with the four sides of the reamer bar slot, a wedge having a centrally located tap disposed centrally in the bar slot between the reamer blades and normally maintaining contact with the bevelled end surfaces of the blades, a bevelled head adjusting screw projecting through a similarly shaped hole in the reamer bar at right angles to the bar slot and engaging the threads of the wedge tap, a pair of bevelled head set screws adjustably carried by said reamer bar, one located adjacent to a reamer blade, and a centrally located conical detent in one side of the reamer bar, the axis of said detent being coaxial with the axis of the hole of the wedge adjusting screw to permit the reamer bar to be engaged by centers of a grinder, upon removal of the adjusting screw, and thereby facilitate the grinding of the reamer blades without removing said blades from the reamer bar, and a single adjustable element disposed in said tool holder at right angles to said bar to progressively engage said conical detent.

4. In a reamer, a pair of cutters and a carrying bar therefor, said cutters extending beyond the ends of the bar, wedge means located in said bar intermediate the adjacent inner ends of said cutters, means for operating said wedge means to effect lateral adjustment of said cutters, a holder for said bar and means for providing a floating mounting for said bar in said holder, said last-named means having means for adjusting the amount of float of the bar with respect to the holder including a detent disposed at the midpoint on one side of said bar and coaxial with the wedge operating means and a single adjustable element disposed in the holder at right angles to said bar to progressively engage said detent.

FRANK V. CALHOUN.